US007817895B2

United States Patent
Kowalczyk et al.

(10) Patent No.: US 7,817,895 B2
(45) Date of Patent: *Oct. 19, 2010

(54) MODULAR OPTICAL WALL BOX ENCLOSURE

(75) Inventors: Scott C. Kowalczyk, Savage, MN (US); Thomas G. LeBlanc, Westminster, MA (US); Jeffery Gniadek, Northbridge, MA (US); Jonathan R. Kaml, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/371,782

(22) Filed: Feb. 16, 2009

(65) Prior Publication Data

US 2009/0208178 A1      Aug. 20, 2009

Related U.S. Application Data

(63) Continuation of application No. 11/762,427, filed on Jun. 13, 2007, now Pat. No. 7,493,003.

(60) Provisional application No. 60/916,482, filed on May 7, 2007.

(51) Int. Cl.
G02B 6/00      (2006.01)

(52) U.S. Cl. ..................................... 385/135

(58) Field of Classification Search ................. 385/135
See application file for complete search history.

(56) References Cited

U.S. PATENT DOCUMENTS

| 5,109,467 A | 4/1992 | Hogan |
| 5,363,440 A | 11/1994 | Daoud |
| 5,509,099 A | 4/1996 | Hermsen et al. |
| 5,511,144 A | 4/1996 | Hawkins |
| 5,732,180 A | 3/1998 | Kaplan |

(Continued)

FOREIGN PATENT DOCUMENTS

DE      91 05 800 U1      6/1991

(Continued)

OTHER PUBLICATIONS

24-Fiber Wall-Mount Box FPL Duplex Adapters, ADC Telecommunications; Fiber Panel Products—Specialty Panels, Jul. 1996, p. 65.

(Continued)

*Primary Examiner*—Charlie Peng
*Assistant Examiner*—Mary A El Shammaa
(74) *Attorney, Agent, or Firm*—Merchant & Gould P.C.

(57) ABSTRACT

A modular fiber optic enclosure for enclosing optical fiber connections that includes a base housing module with a plurality of sides having a front end portion and a back end portion and a base disposed at the back end portion, wherein the base and the sides define an interior region. The modular fiber optic enclosure also includes a termination module that is pivotally engaged to the front end portion of one of the sides of the base housing module and selectively moveable between an open position and a closed position. The modular fiber optic enclosure further includes a cover that is pivotally engaged with the termination module and selectively moveable between an open position and a closed position.

13 Claims, 12 Drawing Sheets

U.S. PATENT DOCUMENTS

| | | | |
|---|---|---|---|
| 5,828,807 | A | 10/1998 | Tucker et al. |
| 5,907,127 | A | 5/1999 | Daoud |
| 5,982,972 | A | 11/1999 | Tucker |
| 6,118,868 | A | 9/2000 | Daoud |
| 6,201,920 | B1 | 3/2001 | Noble |
| 6,291,767 | B1 | 9/2001 | Beecher, II |
| 6,321,017 | B1 | 11/2001 | Janus |
| 6,356,697 | B1 | 3/2002 | Braga |
| 6,385,381 | B1 | 5/2002 | Janus |
| 6,591,053 | B2 | 7/2003 | Fritz |
| 6,621,975 | B2 | 9/2003 | Laporte |
| 6,661,961 | B1 | 12/2003 | Allen |
| 6,721,484 | B1 | 4/2004 | Blankenship |
| 6,815,612 | B2 | 11/2004 | Bloodworth |
| 7,239,789 | B2 | 7/2007 | Grubish et al. |
| 7,346,253 | B2 | 3/2008 | Bloodworth et al. |
| 7,349,616 | B1 | 3/2008 | Castonguay et al. |

FOREIGN PATENT DOCUMENTS

| | | |
|---|---|---|
| DE | 43 32 537 A1 | 5/1994 |
| EP | 1 203 974 A2 | 5/2002 |
| EP | 1 565 009 A2 | 8/2005 |
| WO | WO 00/52504 A3 | 9/2000 |

OTHER PUBLICATIONS

ADC® Telecommunications, *FTUA 4- and 12-Fiber Wall Box User Manual*, ADCP-90-240, Issue 2, Mar. 1997, pp. 1-14.

ADC® Telecommunications, *Wall Mount Box 12/24/36 Fiber User Manual*, ADCP-90-149, Issue 3, Jul. 1997, pp. 1-14 with Appendix pp. A1-A2.

FL1000—Customer Premises Fiber Distribution Products, ADC Telecommunications; © 1998, pp. 1-8.

FONS Enhanced TIC Series Cabinets, Interior Wall Mount Terminals, FONS® Fiber Optic Network Solutions, now part of ADC Telecommunications, Inc., FONS Corp. © 2005, pp. 1-3.

FONS Indoor Fiber Distribution Terminal, Interior Wall Mount Terminals, FONS® Fiber Optic Network Solutions, now part of ADC Telecommunications, Inc., FONS Corp. © 2005, pp. 1-3.

FONS LX-10 Series Cabinets, Wall Mount Enclosures, FONS® Fiber Optic Network Solutions, now part of ADC Telecommunications, Inc., FONS Corp. © 2005, pp. 1-3.

FONS Small Termination Interconnect Cabinet; FONS® Fiber Optic Network Solutions, now part of ADC Telecommunications, Inc., FONS Corp. © 2005, 2 pages.

FONS TIC Series Cabinets, Indoor Wall Mount Terminals, FONS® Fiber Optic Network Solutions, now part of ADC Telecommunications, Inc., FONS Corp. © 2005, pp. 1-3.

FONS Wall Mount Patch/Splice Enclosure, Indoor Wall Mount Terminals, FONS® Fiber Optic Network Solutions, now part of ADC Telecommunications, Inc., FONS Corp. © 2005, 1 page.

MODULAR OPTICAL WALL BOX ENCLOSURE

CROSS-REFERENCE TO RELATED APPLICATION

This application is a continuation of U.S. patent application Ser. No. 11/762,427 (now pending), entitled "Modular Optical Wall Box Enclosure" and filed on Jun. 13, 2007, which claims the benefit of U.S. Provisional Patent Application Ser. No. 60/916,482, filed May 7, 2007. The above identified applications are hereby incorporated by reference in their entirety.

TECHNICAL FIELD

The present invention relates to an apparatus for termination and storage of optical fiber cables, such as distribution cables.

BACKGROUND

As demand for telecommunications increases, optical fiber services are being extended in more and more areas. To more efficiently extend the fiber optic service into areas where current and future customers are located, often fiber optic cables with more than one optical fiber are utilized. To provide service, for example, in a multiple dwelling unit, the multi-fiber cables may be received within a fiber optic enclosure. Such enclosures provide connection locations where one or more optical fibers of the multi-fiber cable may be connected to end users/subscribers.

Typically, fiber optic enclosures for multiple dwelling units require the use of multiple and separate wall boxes. However, the use of multiple and separate wall boxes results in increased installation time and cost, as well as space requirements.

SUMMARY

An aspect of the disclosure relates to a modular fiber optic enclosure for enclosing optical fiber connections that includes a base housing module with a plurality of sides having a front end portion and a back end portion and a base disposed at the back end portion. The base and the sides of the base housing module define an interior region. The modular fiber optic enclosure also includes a termination module that is pivotally engaged to the front end portion of one of the sides of the base housing module and selectively moveable between an open position and a closed position. The modular fiber optic enclosure further includes a cover that is pivotally engaged with the termination module and selectively moveable between an open position and a closed position.

Another aspect of the disclosure relates to a method of installing a modular fiber optic enclosure that includes the steps of providing a modular fiber optic enclosure that includes a base housing module with a plurality of sides with a front end portion and a back end portion and a base disposed at the back end portion. The base and the sides of the base housing module define an interior region. The modular fiber optic enclosure also includes a cover that is pivotally engaged with the base housing module at the front end portion and selectively moveable between an open position and a closed position. In the method, the cover is disengaged from the front end portion of the base housing module. A back portion of a termination module is pivotally engaged with the front end portion of the base housing module such that the termination module is selectively moveable between an open position and a closed position with respect to the base housing module. The cover is pivotally engaged with the front portion of the termination module such that the cover is selectively moveable between an open position and a closed position with respect to the termination module.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used through out the drawings to refer to the same or like parts.

Figure 1:
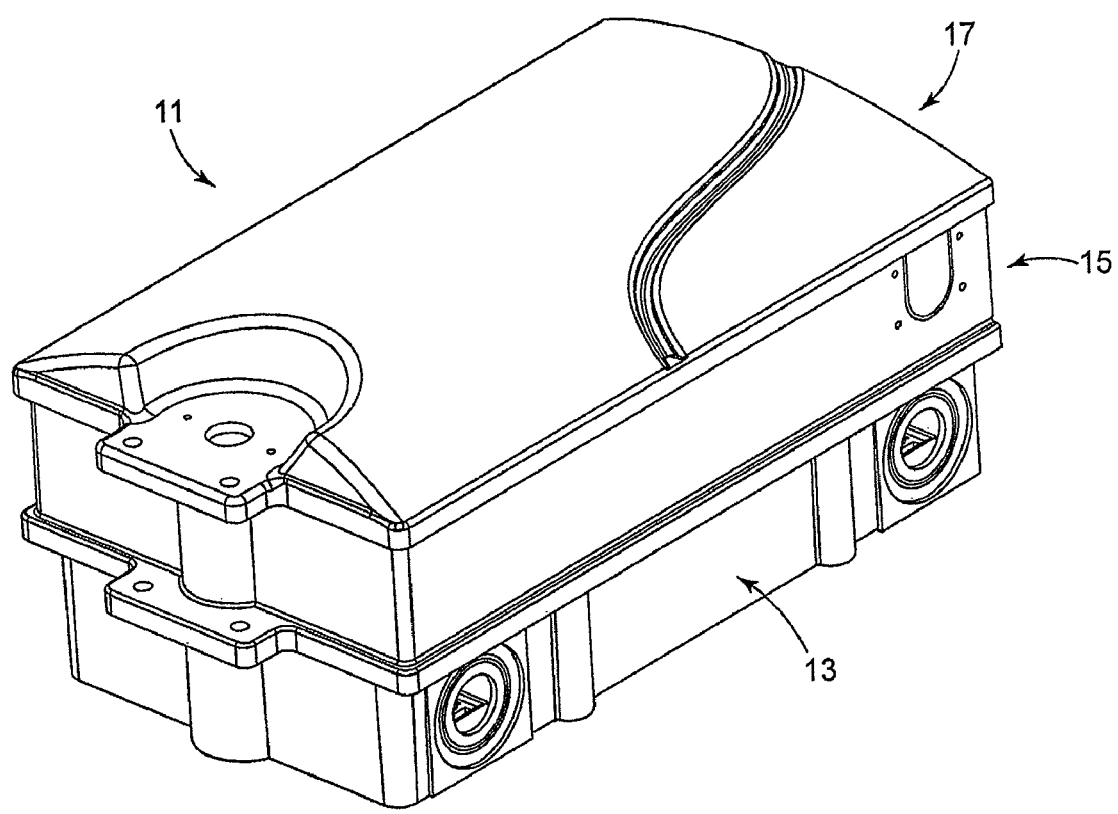
FIG. 1 is a perspective view of a modular fiber optic enclosure having features that are examples of inventive aspects in accordance with the principles of the present disclosure.

Referring now to FIG. 1, a modular fiber optic enclosure, generally designated 11, is shown. The modular fiber optic enclosure 11 encloses optical fiber connections between incoming fiber and outgoing fiber so as to establish a desired optical connection. Examples of incoming fiber include fibers of a feeder cable from a service provider and intermediate fibers that connect the feeder cable fibers to a termination region (e.g., connectorized pigtails extending from splice trays and patching fibers/jumpers). Examples of outgoing fibers include the subscriber cable fibers that exit the modular fiber optic enclosure 11 and any intermediate fibers that connect the subscriber cable fibers to the termination module. The modular fiber optic enclosure 11 of the subject embodiment will be described in the present disclosure as being mounted to a wall in a multiple-dwelling unit, such as an apartment building or a condominium. However, it will be understood by those skilled in the art that the scope of the present disclosure is not limited to wall-mounted fiber optic enclosures. In the subject embodiment, the modular fiber optic enclosure 11 includes a base housing module, generally designated 13, a termination module, generally designated 15, and a cover, generally designated 17.

Figure 2:
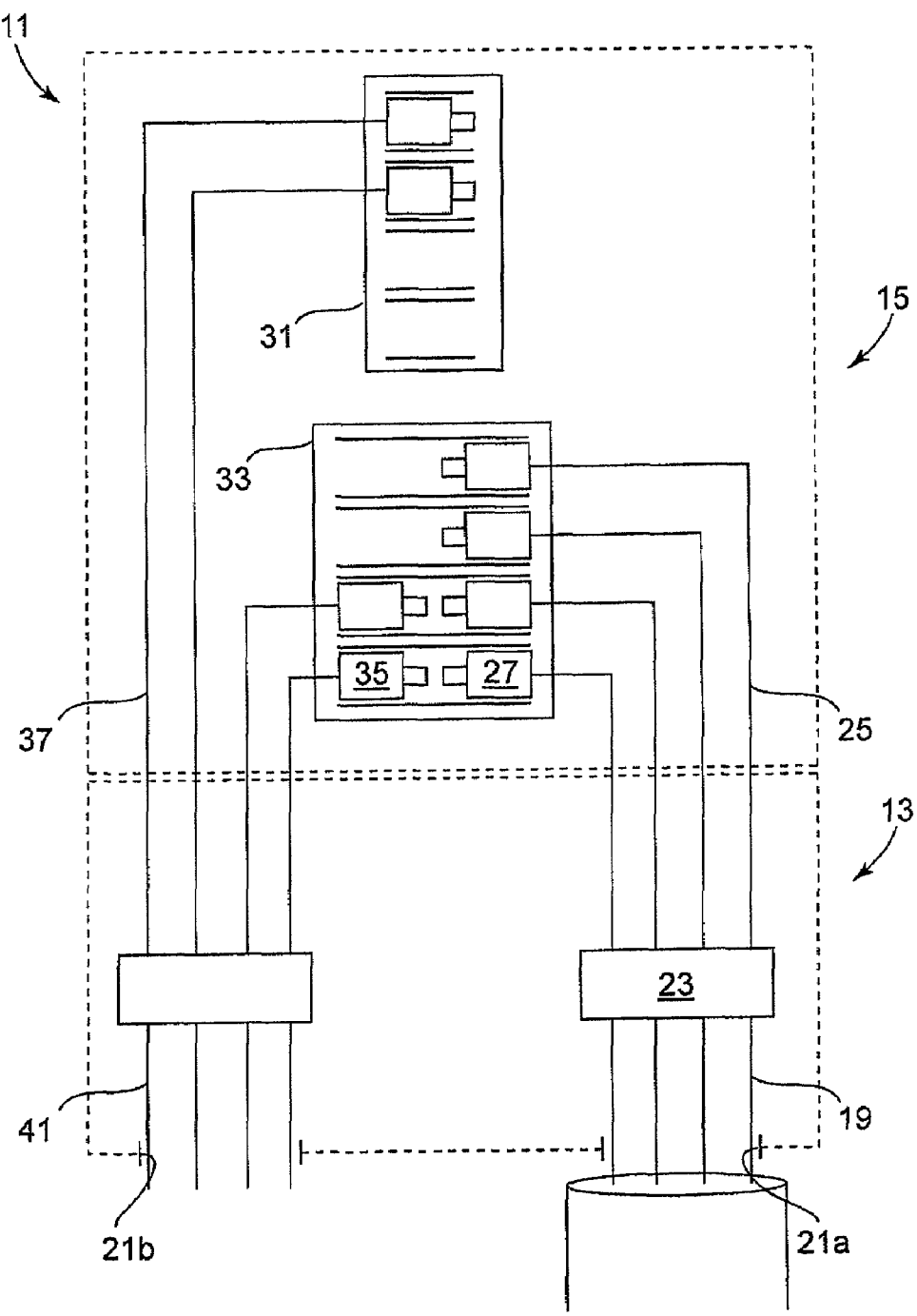
FIG. 2 is a cable routing schematic suitable for use within the modular fiber optic enclosure of FIG. 1.

Referring now to FIG. 2, a schematic representation of a cable routing scheme for the modular fiber optic enclosure 11 is shown. A multi-fiber feeder cable 19 is routed into the modular fiber optic enclosure through a feeder cable port 21a in the base housing module 13. After entering the base housing module 13 of the modular fiber optic enclosure 11, the feeder cable 19 is directed to a splice tray 23, where one or more of the fibers of the feeder cable 19 are individually connected to pigtails 25, each having a connectorized end 27. The pigtails 25 each include an optical fiber surrounded by a cladding and at least one protective coating. A buffer layer surrounds the protective coating of the pigtails 25. Typically, the buffer layer has an outer diameter of 900 µm. The pigtails 25 are routed from the base housing module 13 to the termination module 15 of the modular fiber optic enclosure 11.

At the termination module 15, the pigtails 25 are routed to the back side of a termination bank 33 that is mounted in the termination module 15. At the termination bank 33, the connectorized ends 27 of the pigtails 25 are connected to connectorized ends 35 of pigtails 37. The termination module 15, therefore, is the dividing line between the incoming fibers and the outgoing fibers. In the subject embodiment, the pigtails 37 are preferably more robust than the pigtails 25. In one embodiment, the pigtails 37 include an optical fiber surrounded by a cladding, at least one protective coating, and a buffer layer. The pigtails 37 can also include a strength layer that surrounds the buffer layer and an outer jacket that surrounds the strength layer. The outer diameter of the outer jacket can be about 2 mm. In the depicted embodiment, the pigtails 37 are then routed to a splice tray 39, where the pigtails 37 are spliced to subscriber cables 41. The subscriber cables 41 can have a similar configuration as the pigtails 37. The subscriber cables 41 are routed from a front side of the termination bank 33 to the base housing module 13 through a pigtail port 29 (shown in FIG. 3), and then exit the base housing module 13 through a subscriber cable port 21b and are routed to subscriber locations (e.g., individual residences, apartments, condominiums, businesses, etc.). The termination module 15 can also include a storage bank 31 for holding the connectorized ends of the pigtails 37 corresponding to residences/businesses that have not subscribed to the service. If one of such residences/businesses subsequently subscribes, the corresponding connectorized pigtail 37 is disconnected from the storage bank 31 and connected to the termination bank 33 so that the residence/business is connected to a corresponding fiber of the cable 19 and thereby provided with telecommunications service.

As is well known to those skilled in the art, fan-out devices are typically used in enclosures to separate fibers in a multi-fiber cable, such as a ribbon cable, or to recombine separate fibers into a multi-fiber cable. While fan-out devices have not been shown in FIG. 2, it will be understood by those skilled in the art that in many applications of the modular fiber optic enclosure, fan-out devices could be used.

Figure 3:
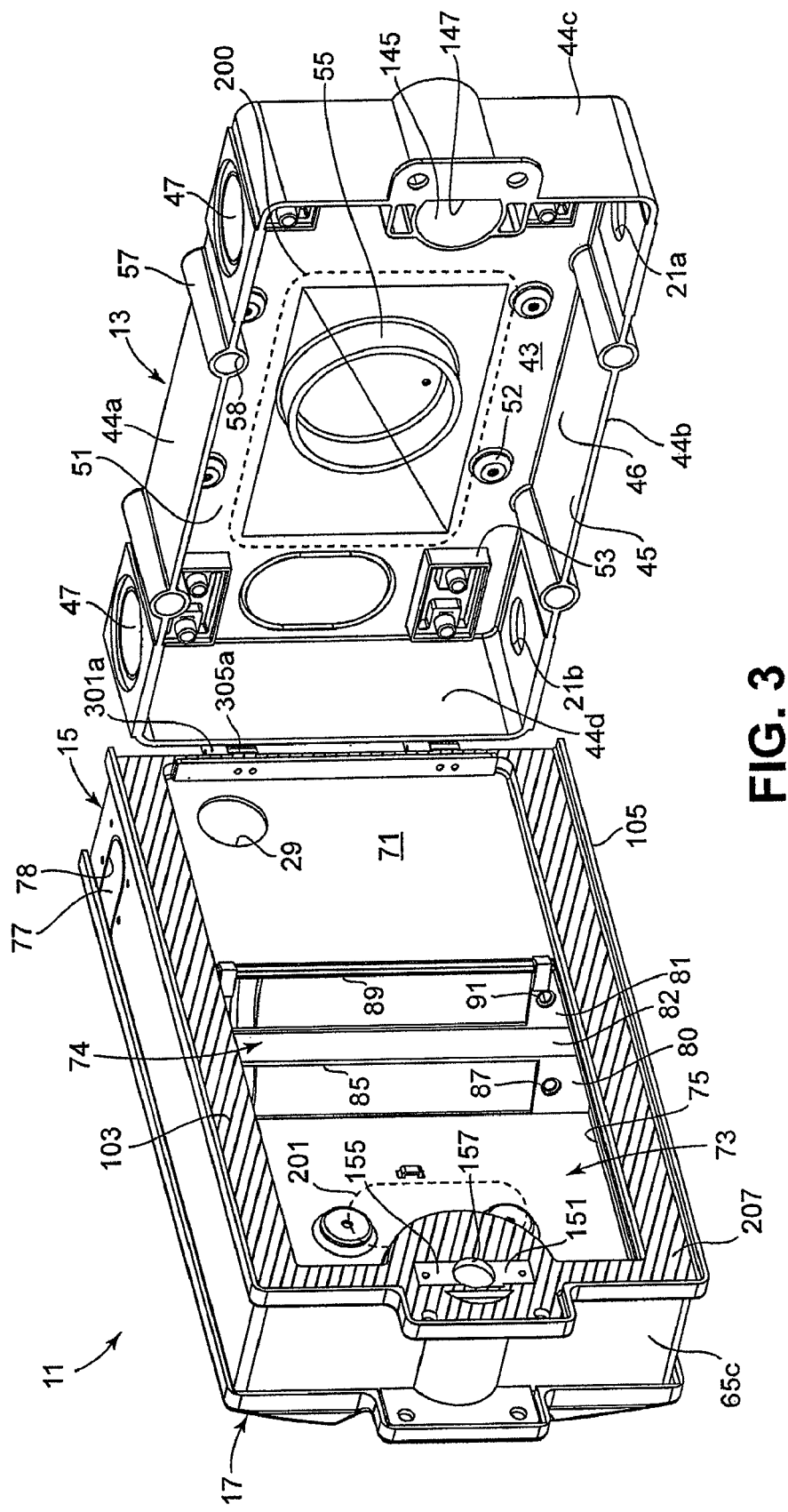
FIG. 3 is a perspective view of a base housing module of the modular fiber optic enclosure of FIG. 1.

Referring now to FIG. 3, the base housing module 13 of the modular fiber optic enclosure 11 is shown. The base housing module 13 is a multi-functional module that provides access, storage, and mounting functionality. The base housing module 13 provides access functionality by serving as the point of entry into the modular fiber optic enclosure 11 for the feeder cable 19 (shown schematically in FIG. 2) and the subscriber cables 41 (shown schematically in FIG. 2). The base housing module 13 includes a base 43 and a plurality of sides 44a, 44b, 44c, 44d, which extend generally perpendicular from the base 43. Each of the sides 44 include a front end portion 45 and a back end portion 46. In the subject embodiment, the back end portions 46 of the sides 44 are integrally molded with the base 43. At least one "punch-out" area 47 is defined by at least one of the plurality of sides 44. In a preferred embodiment, two punch-out areas 47 are disposed on each of two sides 44a, 44b of the base housing module 13. The punch-out areas 47 are designed to be removed, or "punched out", as needed. With the punch-out areas 47 removed, the cable ports 21 are exposed. The feeder and subscriber cables 19, 41 are fed through the cable ports 21a, 21b, respectively, so as to provide a point of entry for the feeder and subscriber cables 19, 41 into the base housing module 13.

In addition, the base housing module 13 provides storage functionality by serving as a storage area for excess lengths of the feeder and subscriber cables 19, 41. The base 43 and the plurality of sides 44 cooperate to define an interior region 51 of the base housing module 13. While the interior region 51 has many different purposes in the base housing module 13, one of those purposes is to store excess lengths of the fibers corresponding to the feeder cable 19 and the subscriber cable 41. If there are excess lengths of fiber/cable, the excess length can be coiled or looped within the interior region 51. In the subject embodiment, clip mounts 52 are disposed on the base 43. The clip mounts 52 are provided for mounting clips (not shown) that serve a cable management function. The clips that are mounted to the clip mounts 52 generally retain the excess lengths of fiber/cable in a coiled or looped configuration that extends along a loop path 200 so that the organization of the base housing module 13 is maintained. Clip mounts 52 can also hold clips that route fibers corresponding to the cable 19 along a loop path 201. It will be understood by those skilled in the art, however, that while clips have been described, other cable management structures, such as spools, could also be used in the base housing module 13.

In addition to access and storage functionality, the base housing module 13 also provides mounting functionality. In the base housing module 13, there are three types of mounts. The first type of mount includes cable mounts 53 that are disposed adjacent to the punch-out areas 47a, 47b. A conventional cable clamp (not shown), which is in threaded engagement with the cable mounts 53, secures the feeder cable/cables 19 to the base housing module 13 so as to prevent any inadvertent movement of the feeder cables 19 within the base housing module 13.

The second type of mount includes a splice tray mount 55. The splice tray mount 55 projects outwardly from the base 43 of the base housing module 13. In the subject embodiment, the splice tray mount 55 is cylindrically shaped with the inner diameter of the splice tray mount 55 adapted for engagement with the splice tray 23 (shown schematically in FIG. 2). However, as various mounts for splice trays could be used in the base housing module 13, the scope of the present invention is not limited to the splice tray mount 55 being cylindrically shaped.

The third type of mount in the base housing module 13 includes a plurality of wall mounts 57. In the subject embodiment, the wall mounts 57 are integrally formed with the sides 44a, 44b and are cylindrical in shape. As stated previously, the subject embodiment of the modular fiber optic enclosure 11 is designed to be mounted to a wall in a multiple dwelling unit.

Therefore, a plurality of retainers (not shown), such as nails, bolts, or screws, can be inserted through passages 58 defined by the wall mounts 57 and fastened into the wall of the multiple dwelling unit, thereby securely mounting the base housing module 13 to the wall.

Figure 4:
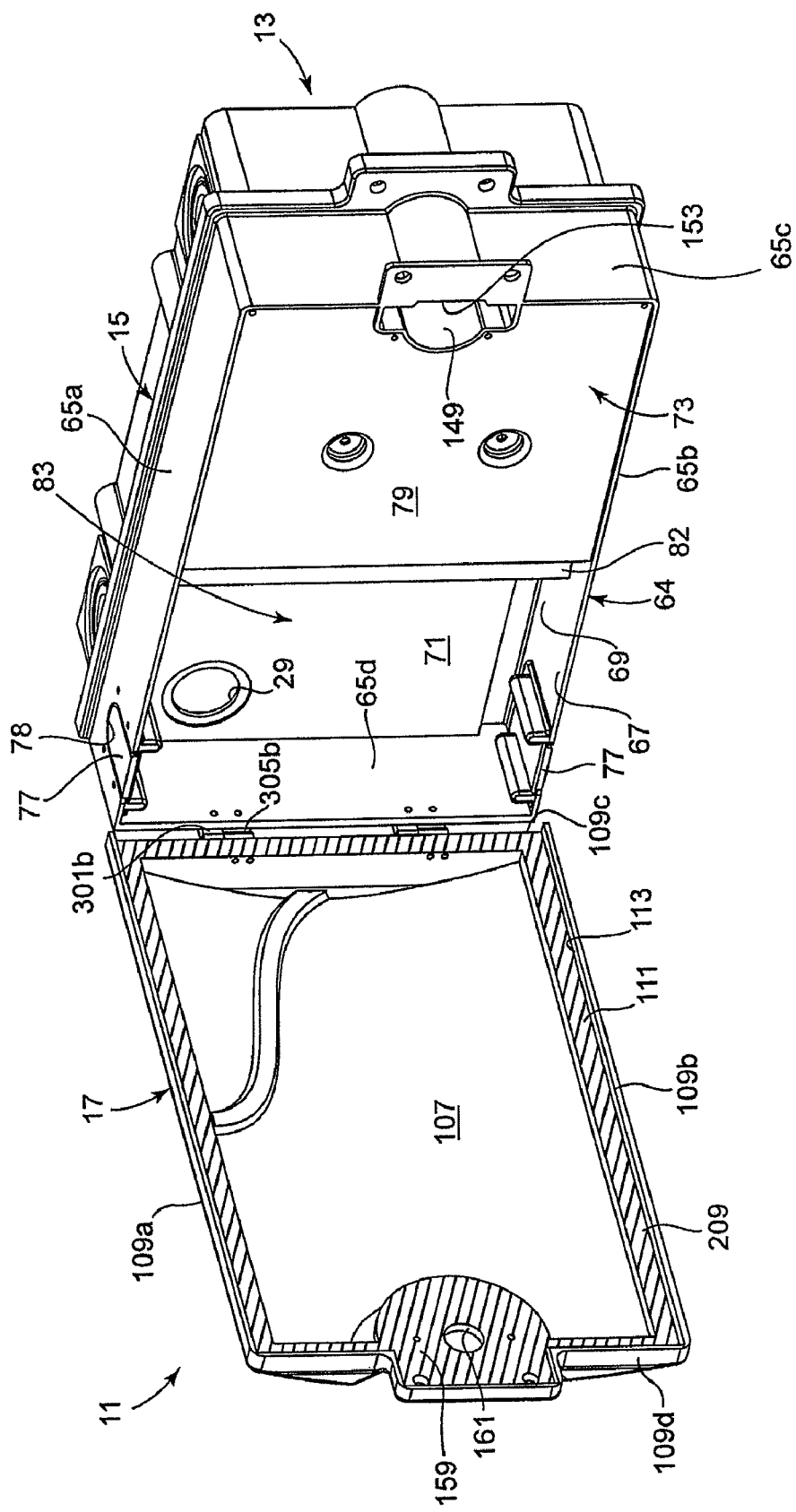
FIG. 4 is a perspective view of the front of a termination module of the modular fiber optic enclosure of FIG. 1.

Referring now to FIG. 4, a front view of the termination module 15 of the modular fiber optic enclosure 11 is shown. As previously stated with regard to FIG. 2, the termination module 15 serves as the dividing line between the incoming fibers and the outgoing fibers, wherein the connectorized ends 27 of the pigtails 25 are connected to the connectorized ends 35 of the pigtails 37. The termination module 15 includes a frame, generally designated 64, that is defined by a plurality of sidewalls 65a, 65b, 65c, 65d. The frame 64 has a front portion 67 and a back portion 69. The termination module 15 further includes a rear panel 71, a front panel portion, generally designated 73, and a stepped intermediate panel portion, generally designated 74.

In the subject embodiment, the rear panel 71 is integrally formed with the back portion 69 of the frame 64. The pigtail port 29, the purpose of which was described above, is disposed in the rear panel 71 of the termination module 15. Disposed adjacent the rear panel 71 is an opening 75 (shown in FIG. 3). In the subject embodiment, sidewalls 65a, 65b each define a punch-out region 77. When the punch-out region 77 is removed, a port 78 is exposed. The ports 78 can be used as additional cable ports for routing subscriber cables 41 into and out of the modular fiber optic enclosure 11 without passing through the base housing module 13.

Referring again to FIGS. 3 and 4, in the subject embodiment, the front panel portion 73 and the stepped intermediate panel portion 74 are part of a separate component that is secured (e.g., fastened) to the frame 64 of the termination module 15. The front panel portion 73 is generally parallel to the rear panel 71 and is located adjacent to the front portion 67 of the frame 64. The stepped intermediate panel portion 74 extends from the rear panel 71 to the front panel portion 73 and includes first and second intermediate panels 80, 81 that are separated by a step 82. In the subject embodiment, the first and second intermediate panels 80, 81 angularly extend between the front panel 79 and the rear panel 71.

In the subject embodiment, a recess region, generally designated 83 (shown in FIG. 4), is defined by the rear panel 71, sidewalls 65a, 65b, 65d and the first and second intermediate panels 80, 81. As previously stated, the connectorized ends 27 of the pigtails 25 are inserted in the back side of the termination bank 33 to provide connections with the connectorized ends 35 of the pigtails 37 that are inserted in the front side of the termination bank 33. The recess region 83, which is disposed adjacent the front side of the termination bank 33, provides space in the termination module 15 for the extension of the pigtails 37 through the pigtail port 29 for storage of excess pigtail length and for providing clearance and access relating to the connectorized ends of the pigtails 37 that are plugged into the storage and termination banks 31, 33.

Figure 5:
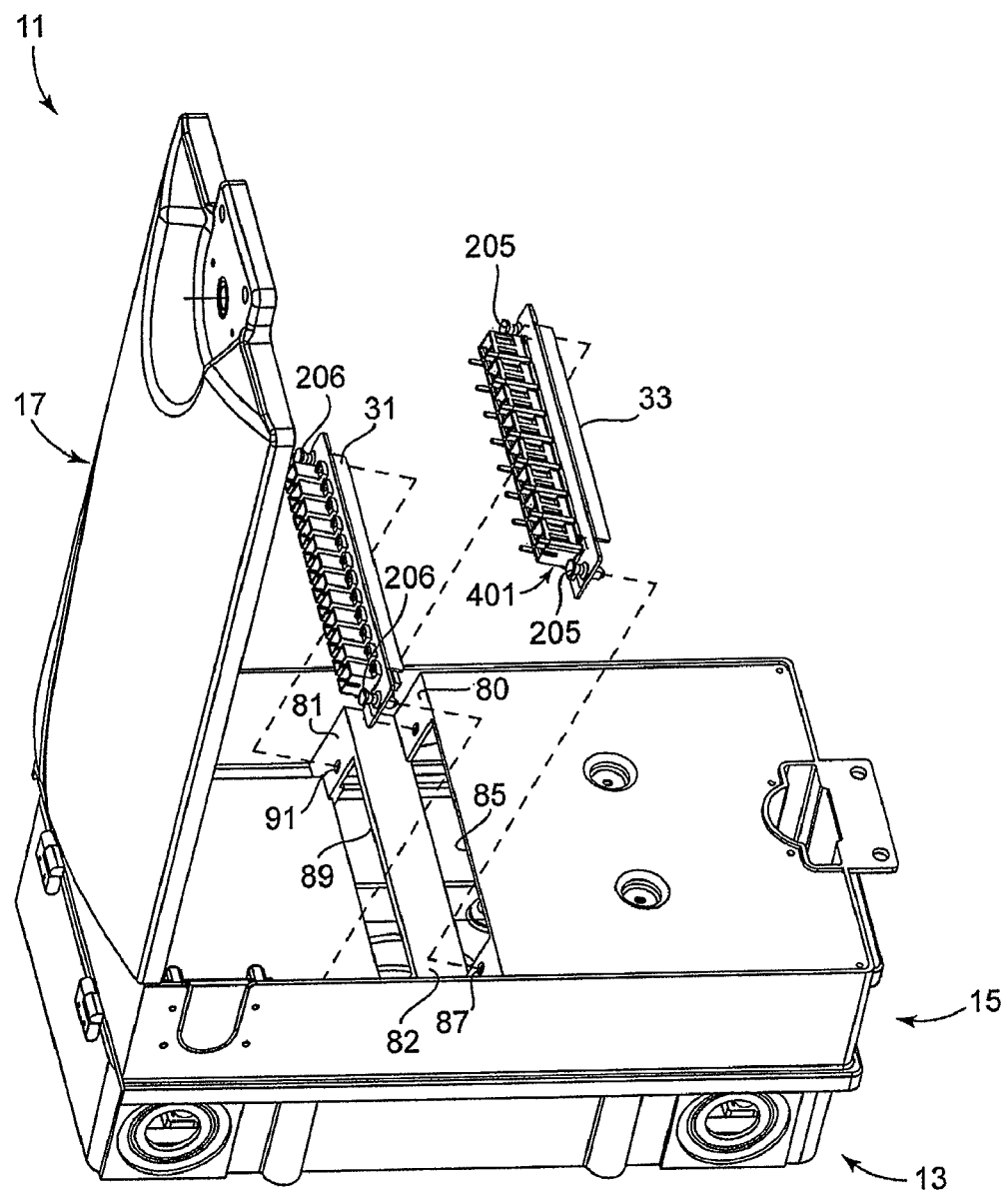
FIG. 5 is a perspective view of the modular fiber optic enclosure of FIG. 1 with a storage bank and termination bank.

Referring now to FIGS. 3 and 5, the first intermediate panel 80 of the stepped intermediate panel portion 74 defines a termination bank opening 85 and a plurality of termination bank fastener openings 87, which are disposed adjacent to the termination bank opening 85. The termination bank 33 (shown in FIG. 5 and schematically in FIG. 2) is inserted through the termination bank opening 85 and mounted to the first intermediate panel 80 using fasteners 205 that mount within the termination bank fastener openings 87. The second intermediate panel 81 defines a storage bank opening 89 and a plurality of storage bank fastener openings 91, which are disposed adjacent to the storage bank opening 89. The storage bank 31 (shown in FIG. 5 and schematically in FIG. 2) is inserted through the storage bank opening 89 and mounted to the second intermediate panel 81 using fasteners 206 that fit within the storage bank fastener openings 91.

Figure 6:
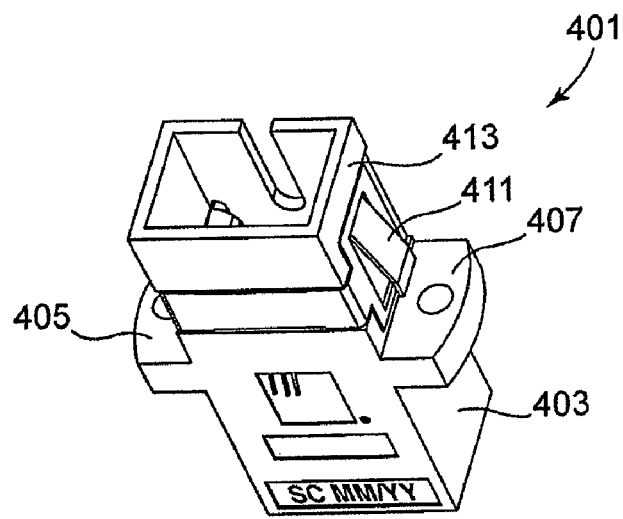
FIG. 6 is an adapter from the storage and termination banks of FIG. 5.
Figure 7:
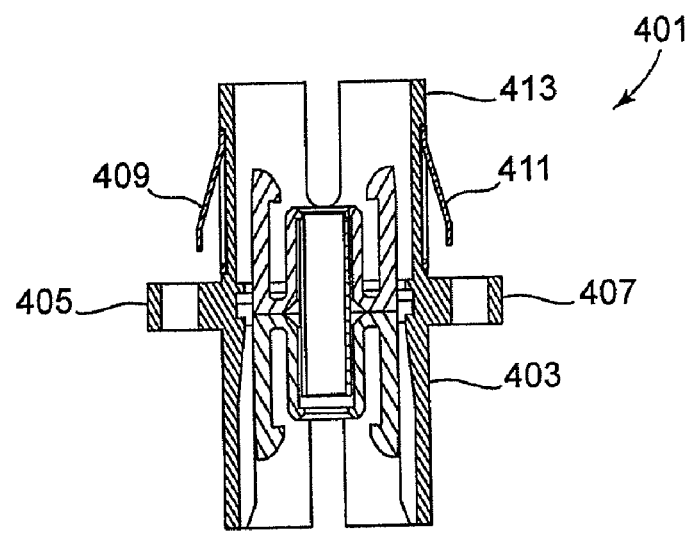
FIG. 7 is a cross-sectional view of the adapter taken on line 7-7 in FIG. 6.

Referring now to FIGS. 5-7, the storage bank 31 and the termination bank 33 are adapted to receive a plurality of adapters 401. In the subject embodiment, the adapters 401 are SC-type adapters 401, although it will be understood by those skilled in the art that the scope of the present invention is not limited to SC-type adapters 401. As the SC-type adapter 401 was described in U.S. Pat. No. 5,317,663, which is assigned to the assignee of the present invention and incorporated herein by reference, the SC-type adapter will only be briefly described herein. The SC-type adapter includes a main body 403 with a pair of tabs 405, 407 located on the exterior of the main body 403. The tabs 405, 407 serve to support the adapter 401 in the storage bank 31 and the termination bank 33. The adapter 401 further includes a pair of retaining clips 409, 411, with one retaining clip 409, 411 associated with each tab 405, 407. A front side 413 of the adapter 401 is inserted into the bank 31, 33. As the adapter 401 is inserted through the bank 31, 33, the retaining clips compress against the main body 403. The adapter is inserted into the bank 31, 33 until the tabs 405, 407 abut the bank 31, 33. With the tabs 405, 407 abutting the bank 31, 33, the retaining clips 409, 411 decompress on the opposite side of the bank 31, 33, thereby retaining the adapter plate 31 between the retaining clips 409, 411 and the tabs 405, 407. As the termination bank 33 reaches full capacity, the storage bank 31 can be used as a termination bank to service more subscribers.

Figure 8:
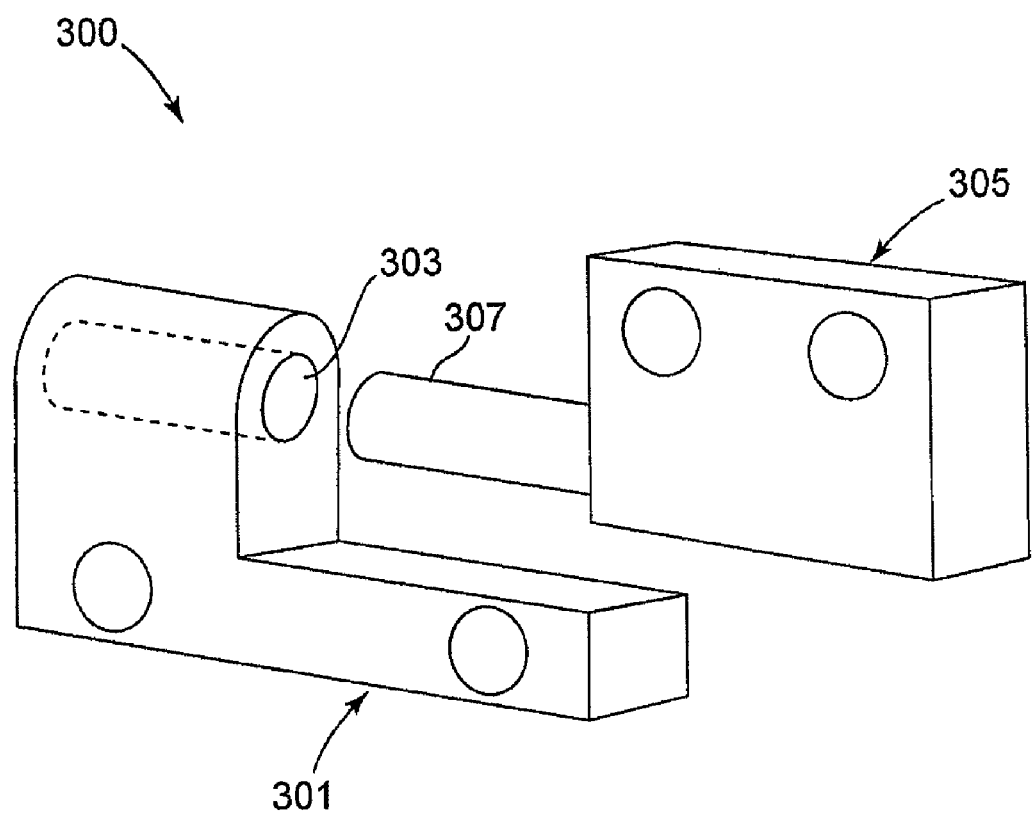
FIG. 8 is a perspective view of a hinge assembly suitable for use with the modular fiber optic enclosure of FIG. 1.
Figure 9:
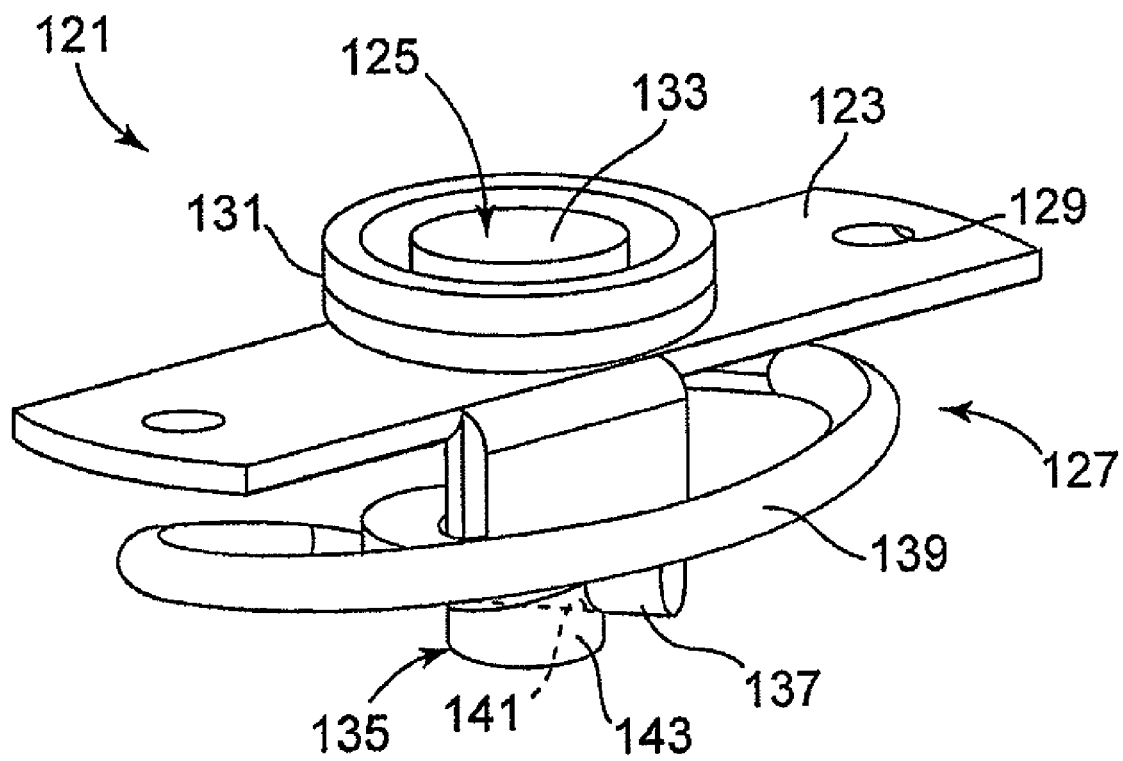
FIG. 9 is a perspective view of a latching mechanism suitable for use with the modular fiber optic enclosure of FIG. 1.
Figure 10:
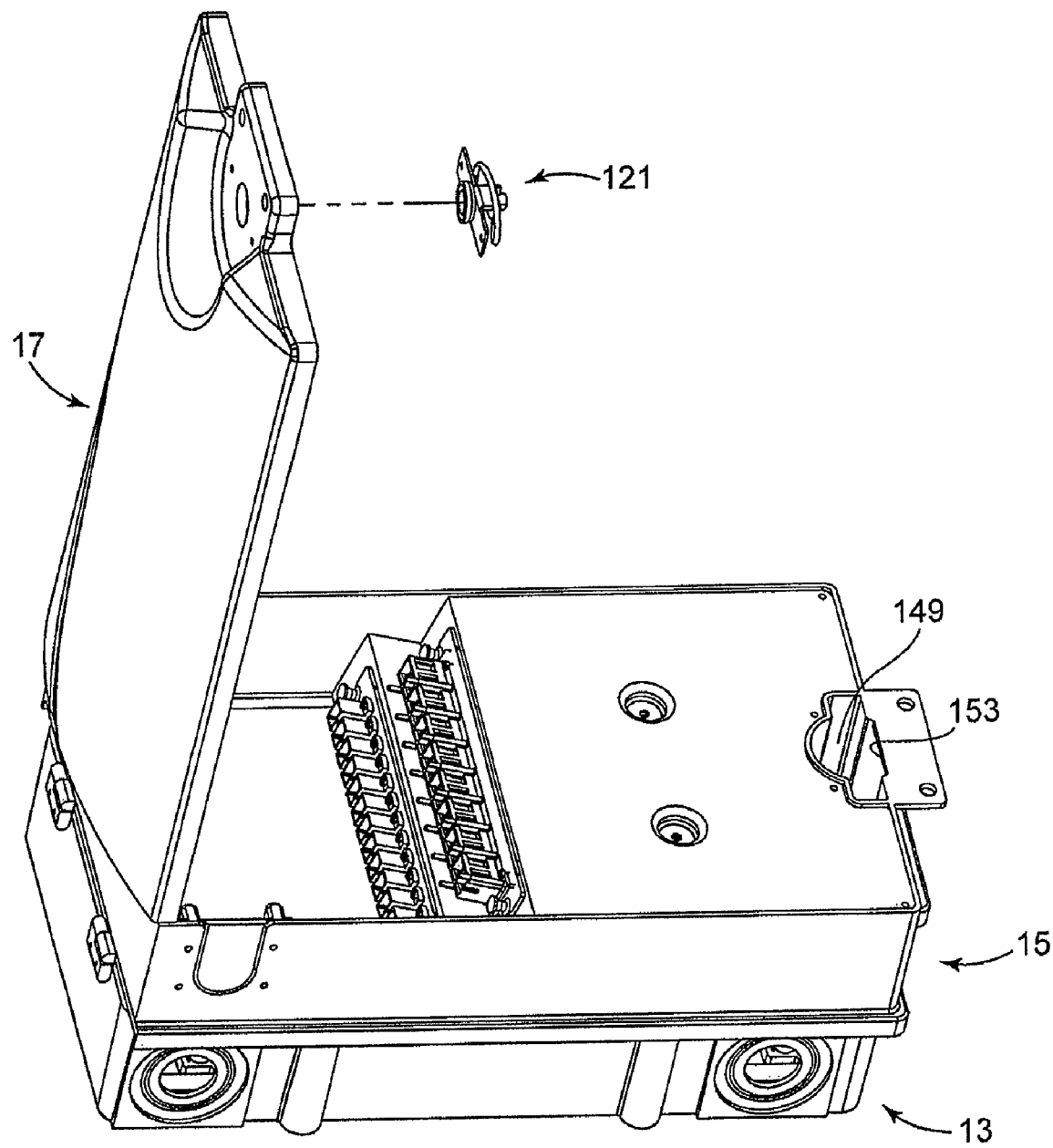
FIG. 10 is a perspective view of the fiber optic enclosure of FIG. 1.

Referring now to FIG. 8, a hinge assembly, generally designated 300, will be described. The hinge assembly 300 includes a hinge component 301 (e.g., a bearing sleeve for receiving a pin) having an opening 303 and a hinge component 305 (e.g., a hinge pin) having a pin 307 that is adapted to be received in the opening 303. In the subject embodiment, multiple hinge assemblies 300 are used for engagement between the different modules of the modular fiber optic enclosure 11.

Referring again to FIGS. 3, 4 and 8, in the subject embodiment, at least one hinge component 305a is disposed on the outer surface of the sidewall 65d of the termination module 15 at the back portion 69. A pin 307a of the hinge component 305a is adapted to be received within an opening 303a of a hinge component 301a that is mounted on the base housing module 13 at the outer surface of the side 44d near the front end portion 45. In addition to the termination module 15 including the hinge component 305a, a hinge component 301b is also disposed on the outer surface of the sidewall 65d of the termination module 15 at the front portion 67. The hinge component 301b of the termination module 15 includes an opening 303b that is adapted to receive a pin 307b that will be defined in more detail subsequently.

The termination module 15 provides a seal surface 103 that extends around the outer periphery of the rear panel 71 and the opening 75. In use, a gasket or seal 207 (shown as crosshatching in FIG. 3) is placed on the seal surface 103 so as to prevent the ingress of water or environmental contaminants between the termination module 15 and the base housing module 13. The termination module 15 defines an outer lip 105 disposed about the periphery of the sidewalls 65a, 65b, and 65c to assist in retaining/seating the seal 207. The outer lip 105 is sized such that the outer lip 105 does not interfere with the outer periphery of the front end portion 45 of the base housing module 13.

The cover 17 of the modular fiber optic enclosure 11 defines a base 107 having a plurality of sides 109a, 109b, 109c, 109d. A seal surface 111 is disposed around the outer periphery of the base 107. In use, a gasket or seal 209 (shown as crosshatching in FIG. 4) is placed on the seal surface 111 so as to prevent the ingress of water or environmental contaminants between the cover 17 and the mating module. The cover 17 further defines an outer lip 113 that extends outwardly from the base 107 and is disposed about the periphery of the sides 109a, 109b, 109d. The outer lip 113 assists in retaining/seating the seal 209. The outer lip 113 is configured so as not to interfere with the outer periphery of the front end portion 45 of the base housing module 13 or the outer periphery of front portion 67 of the termination module 15.

At least one hinge component 305b is disposed on the outer surface of the side 109d of the cover 17. The hinge component 305b includes the pin 307b that is adapted to be received within either the opening 303a of the hinge component 301a disposed on the outer surface of the side 44d near the front end portion 45 of the base housing module 13 or the opening 303b of the hinge component 301b disposed on the outer surface of the sidewall 65d near the front portion 67 of the termination module 15. With the cover 17 engaged with the termination module 15, which is also engaged with the base housing module 13, the outer surfaces of the cover 17, the termination module 15, and the base housing module 13 cooperate to form the exterior surfaces of the modular fiber optic enclosure 11.

Referring to FIGS. 3, 4, 9 and 10, a brief description of a security feature of the modular fiber optic enclosure 11 will be described. After the modular fiber optic enclosure 11 has been installed in a multiple-dwelling unit, the modular fiber optic enclosure 11 can be secured to prevent unauthorized access. Such security can be provided by the incorporation of a latching mechanism, generally designated 121 (shown in FIGS. 9 and 10), in the modular fiber optic enclosure 11. The latching mechanism 121 includes a base plate 123, a rotary member, generally designated 125, and a latch, generally designated 127. The base plate 123 includes a plurality of mounting holes 129 and a cylindrical protrusion 131. Disposed within an opening (not shown) in the cylindrical protrusion 131 is the rotary member 125. The rotary member 125 includes a rotary actuating member 133 that is connected to a pin member, generally designated 135. In the subject embodiment, the rotary actuating member 133 is hexagonal in shape and is actuated/turned by a tool such as a hex-head wrench, although it will be understood by those skilled in the art that the scope of the present invention is not limited to the rotary actuating member 133 being hexagonal in shape and could be keyed for security. The pin member 135 extends from the rotary actuating member 133 through the base plate 123. The latch 127 includes an extension portion 137 and a spiral portion 139. The extension portion 137 is engaged with a thru-hole 141 disposed in an axial end 143 of the pin member 135 and extends about perpendicularly from the center axis of the pin member 135. The spiral portion 139 spirals at least half-way around the pin member 135 from the axial end 143 to the base plate 123.

The base housing module 13 defines a latch opening 145 that is integrally formed in the side 44c of the base housing module 13. A catch, or lip, 147, which retains the latch 127 of the latching mechanism 121, is integrally formed in the front portion 67 of the latch opening 145. The termination module 15 defines a latch passage 149 that is integrally formed in the sidewall 65c that includes a latch mount 151, which is integrally formed in the back portion 69 of the sidewall 65c along the latch passage 149, and a lip 153, which is integrally formed in the front portion 67 of the sidewall 65c along the latch passage 149. The latch mount 151 includes a mounting surface 155 and a hole 157, through which the cylindrical protrusion 131 of the latching mechanism 121 extends when the base plate 123 of the latching mechanism 121 is mounted to the mounting surface 155. With the termination module 15 in a closed position with respect to the base housing module 13 (as shown in FIG. 4), the pin member 135 and the latch 127, while mounted to the mounting surface 155 of the termination module 15, are disposed in the latch opening 145 of the base housing module 13. When the rotary member 125 is actuated, the latch 127 engages or disengages the catch 147 of the base housing module 13, thereby latching and unlatching the base housing module 13 and the termination module 15.

The cover 17 includes a latch mounting surface 159 and a hole 161, through which the cylindrical protrusion 131 of another latching mechanism 121 extends when the base plate 123 of the latching mechanism 121 is mounted to the latch mounting surface 159 of the cover module. With the cover 17 in a closed position with respect to the termination module 15 (as shown in FIGS. 1 and 3), the pin member 135 and the latch 127, while mounted to the latch mounting surface 159 of the cover 17, are disposed in the latch passage 149 of the termination module 15. When the rotary member 125 is actuated, the latch 127 engages or disengages the lip 153 of the termination module 15, thereby latching and unlatching the termination module 15 and the cover 17. If the termination module 15 has not been added to the modular fiber optic enclosure 11 so that the cover 17 is mounted directly to the base housing module 13, the pin member 135 and the latch 127, while mounted to the latch mounting surface 159 of the cover 17, are disposed in the latch opening 145 of the base housing module 13 when the cover 17 is in a closed position with respect to the base housing module 13. When the rotary member 125 is actuated, the latch 127 engages or disengages the catch 147 of the base housing module 13, thereby latching or unlatching the base housing module 13 and the cover 17.

Figure 11:
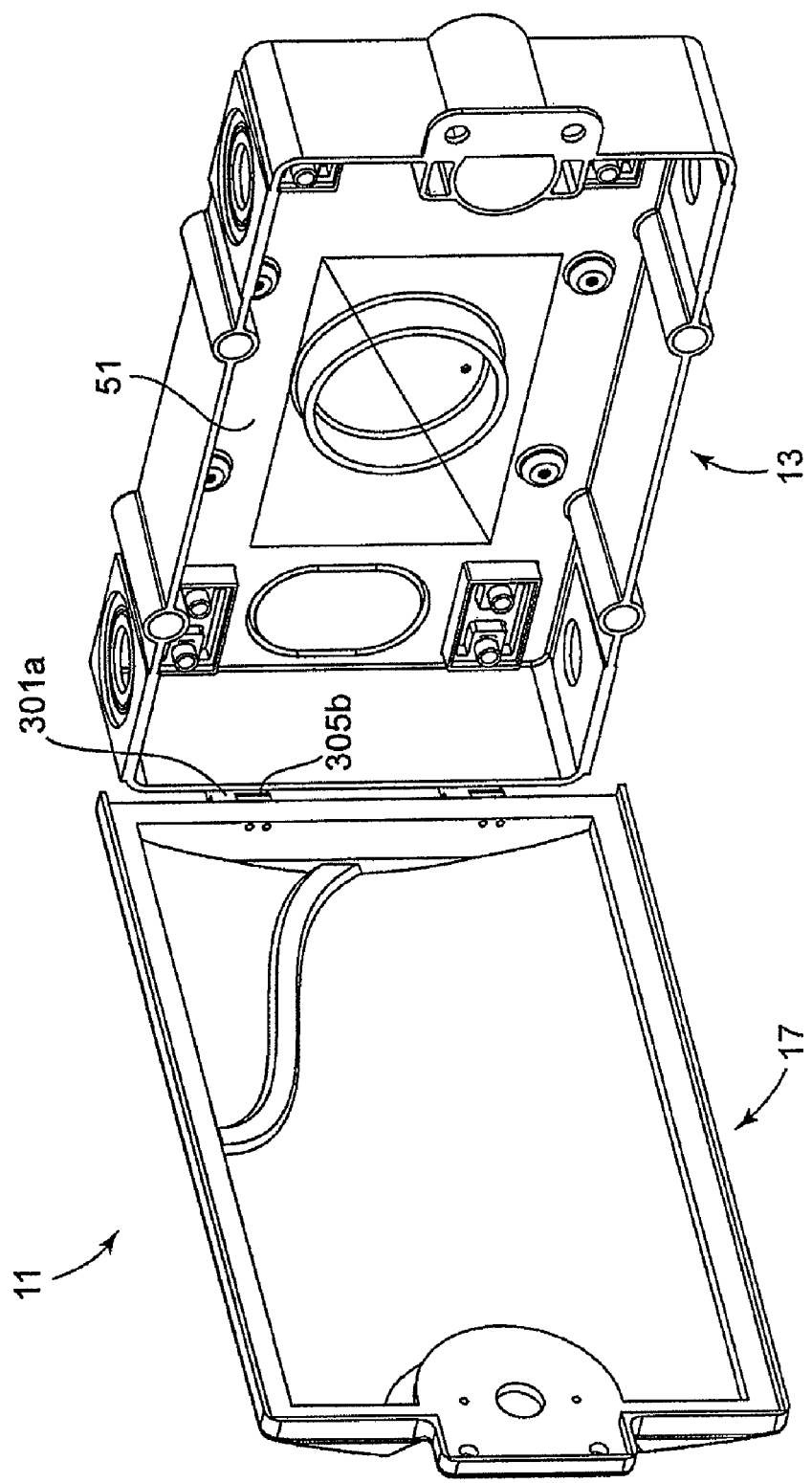
FIG. 11 is a perspective view of the cover of the fiber optic enclosure of FIG. 1 mounted to the base housing module.

The operational aspects of the modular fiber optic enclosure 11 will now be described. Typically, there are three labor groups that are involved in providing service to subscribers. The first group includes contractors. The contractors have the responsibility of mounting the base housing module 13 in a multiple dwelling unit and removing the at least one punch-out area 47 from the at least one side 44a, 44b of the base housing module 13. The feeder cable 19 and the distribution cable 41 are then routed into base housing module 13. Cable clamps (not shown) would likely be mounted to the cable mounts 53 so as to secure the feeder cable 19 and the distribution cable 41 to the base housing module 13. With the feeder cable 19 and the distribution cable 41 stored in the base housing module 13, the contractor would then install the cover 17 to the base housing module 13, as shown in FIG. 11, by inserting the pin 307b of the hinge component 305b on the side 109c of the cover 17 into the opening 303a of the hinge component 301a on the front portion 67 of the base housing module 13. The gasket or seal 209 could also be placed against the seal surface 111 of the cover 17 so as to prevent the ingress of any environmental contaminants into the modular fiber optic enclosure 11.

The second group involved in providing service to subscribers includes optical splicers. In the past, an additional and separate wall mount enclosure would be installed by the optical splicers close to the wall mount enclosure installed by the contractors. In the subject embodiment of the present invention, however, the optical splicers would not need to install an additional wall mount box. Instead, the optical splicers remove the cover 17 from the base housing module 13 and install the splice tray 23 in the splice tray mount 55 of the base housing module 13, which splices the feeder cable 19 into the pigtails 25. Connectorized ends 27, 35 are factory installed on the pigtails 25, 37, respectively. The optical splicer hingedly connects the hinge component 305a of the termination module 15, which is disposed on the outer surface of the sidewall 65d near the back portion 69, to the hinge component 301 a of the base housing module 13, which is disposed on the outer surface of the front end portion 45 of the side 44d. The termination bank 33 and the storage bank 31 are mounted into the termination bank opening 85 and the storage bank opening 89 of the first and second intermediate panels 80, 81, respectively. With the splice tray 23 installed in the base housing module 13, the connectorized ends 27, 35 installed on the pigtails 25, 37, respectively, and the termination bank 33 and the storage bank 31 installed in the termination module 15, the optical splicer would then install the cover 17 to the termination module 15 by inserting the hinge component 305b on the side 109d of the cover 17 into the opening 303b of the hinge component 301b on the back portion 69 of the termination module 15. The gasket or seal 209 could also be placed against the seal surface 111 of the cover 17 so as to prevent the ingress of any environmental contaminants into the modular fiber optic enclosure 11.

The third group involved in providing service to subscribers includes service technicians. The service technicians would open the cover 17 and either remove connectorized ends 35 of the pigtails 37 from the storage bank 31 and insert the connectorized ends 35 into the termination bank 33 to connect service for new subscribers or remove connectorized ends 35 of the pigtails 37 from the termination bank 33 and insert the connectorized ends 35 into the storage bank 31 to disconnect service for previous subscribers.

One potential advantage of the modular fiber optic enclosure 11 is that all labor groups can use the same enclosure, which eliminates the need for separate and additional enclosures. The modular fiber optic enclosure 11, therefore, saves time and space. Since additional wall mounted enclosures are not needed with this modular design, installation time is greatly reduced. In addition, the modular fiber optic enclosure 11 saves wall space as separate and additional wall mounted enclosures are not needed.

Figure 12:
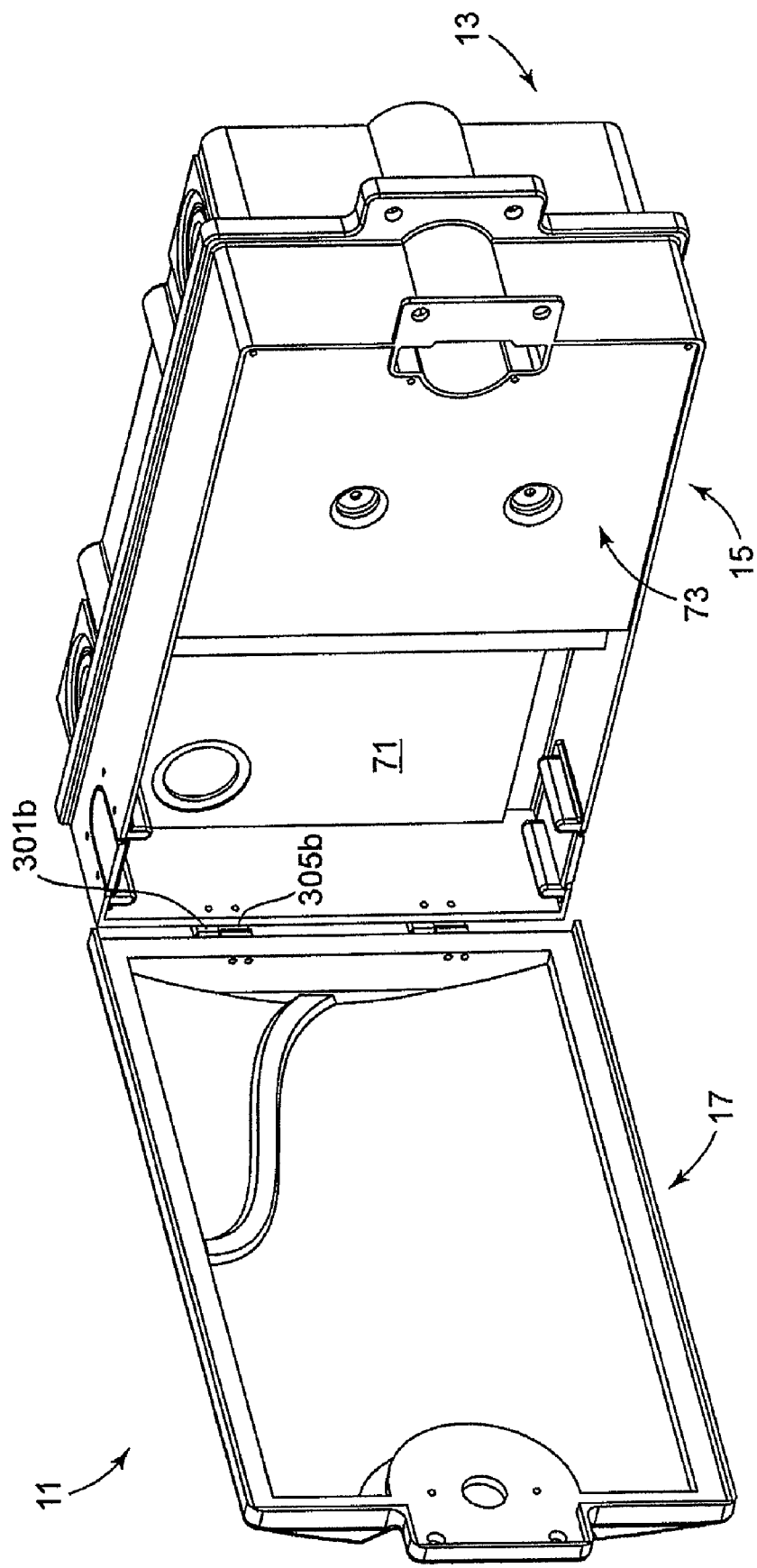
FIG. 12 is a perspective view of the modular fiber optic enclosure of FIG. 1 with the cover in an open position.
Figure 13:
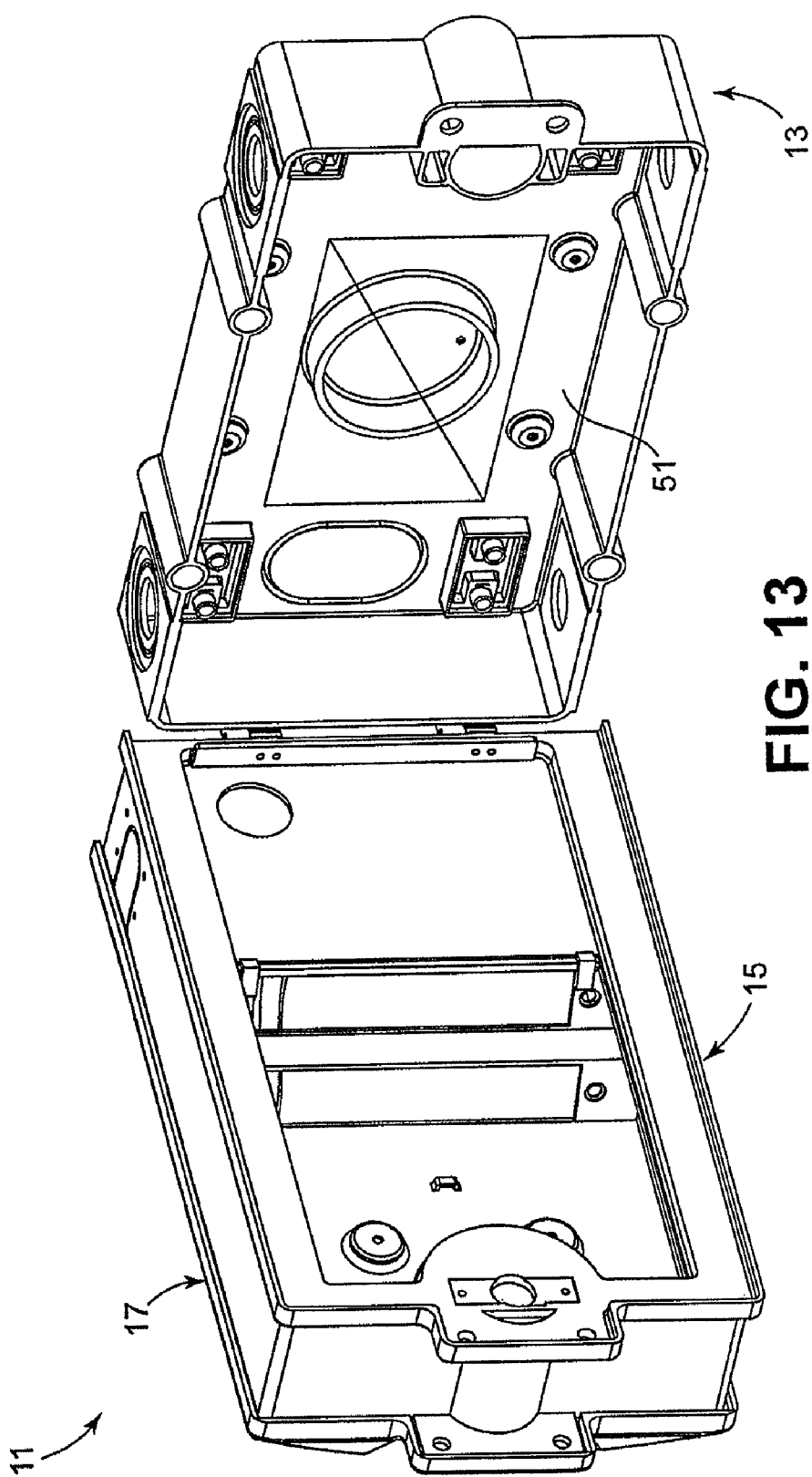
FIG. 13 is a perspective view of the modular fiber optic enclosure of FIG. 1 with a cover and the termination module in an open position.

Referring now to FIGS. 1, 12, and 13, another potential advantage of the modular fiber optic enclosure 11 is shown. As shown in FIG. 1, the cover 17, the termination module 15, and the base housing module 13 are in a stacked configuration, wherein the cover 17 is hingedly engaged to the termination module 15 and the termination module 15 is hingedly engaged with the base housing module 13. This hingedly stacked configuration allows for the modular fiber optic enclosure 11 to be both compact and compartmentalized.

The compartmentalization aspect of the modular fiber optic enclosure 11 is shown in FIGS. 12 and 13. In FIG. 12, the cover 17 of the modular fiber optic enclosure 11 is in an open position with respect to the termination module 15, wherein the open position is such that the cover 17 is rotated about its hinged connection so as to expose the front panel portion 73, the first and second intermediate panels 80, 81 and the rear panel 71 of the termination module 15. The termination module 15, on the other hand, is in a closed position with respect to the housing module, wherein the closed position is such that the termination module 15 does not expose the interior region 51 of the base housing module 13. With the cover 17 in the open position and the termination module 15 in the closed position, only the storage bank 31, the termination bank 33, and the connectorized ends 35 of the pigtails 37 are visible. In other words, when the termination module 15 is in the closed position relative to the base housing module 13, the rear panel 71 and the front panel portion 73 enclose the interior region 51 of the housing module. Therefore, when a service technician opens the cover 17 to either connect or disconnect a subscriber's service, the technician does not see the splice tray 23 and the multiple fibers leading to the termination bank 33 which are contained in the base housing module 13. It is important to note, however, that while the interior region 51 of the base housing module 13 is not visible, the hinged engagement between the base housing module 13 and the termination module 15 makes the interior region 51 easily accessible.

In FIG. 13, the termination module 15 of the modular fiber optic enclosure 11 is in an open position with respect to the base housing module 13, wherein the open position is such that the termination module 15 is rotated about its hinged connection with the base housing module 13 so as to expose the interior region 51 of the base housing module 13. In this open position, the front sides of the termination bank 33 and the storage bank 31, which are mounted to the first and second intermediate panels 80, 81, respectively, of the termination module 15, and the connectorized ends of the pigtails 37 are not visible. It is important to note, however, that while the front sides of the storage and termination banks 31, 33 and the connectorized ends 35 of the pigtails 37 are not visible, the hinged engagement between the base housing module 13 and the termination module 15 makes those components easily accessible. In the position of FIG. 13, the back side of the termination bank 33 and the connectorized ends 27 of the pigtails 25 are visible and readily accessible. Also accessible is the splice tray and the fiber/cable stored at the interior region 51.

An additional potential advantage of the modular fiber optic enclosure 11 concerns the modularity of the modular fiber optic enclosure 11. As the base housing module 13 and the termination module 15 are two separate modules, the termination module 13 can be hingedly connected to the base housing module 13 after the base housing module 13 has been installed. By removing the cover 17 from the base housing module 13, the hinge component 305a of the termination module 15 can be connected engaged with the hinge component 301 a of the base housing module 13. The cover 17 can then be connectedly engaged with the termination module 15.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A method of installing a modular fiber optic enclosure comprising the steps of:
   providing a modular fiber optic enclosure, wherein the modular fiber optic enclosure includes:
      a first module having a base and a plurality of sides, the plurality of sides having a first end portion and a second end portion, the base being disposed at the second end portion, the first end portion defining a first cover mounting location;
      a cover engaged with the first module at the first cover mounting location;
   disengaging the cover from the first cover mounting location of the first module;
   engaging a second portion of a second module with the first end portion of the first module, the second module having a second cover mounting location at a first portion of the second module; and engaging the cover with the first portion of the second module at the second cover mounting location.

2. A modular fiber optic enclosure for enclosing optical fiber connections comprising:

a first module including a base and a plurality of sides having a front end portion and a back end portion, the base being disposed at the back end portion of the plurality of sides, the front end portion including a first cover mount;

a cover mounted at the first cover mount of the first module in a first configuration; and a second module having a plurality of sidewalls having a front portion and a back portion, the front portion having a second cover mount, the back portion being engaged with the front end portion of the first module in a second configuration, wherein the cover is adapted for disengagement from the first cover mount of the first module and engagement with the second cover mount of the second module in the second configuration.

3. A modular fiber optic enclosure for enclosing optical fiber connections as claimed in claim 2, wherein the outer surfaces of the first module, the second module, and the cover cooperate to define the exterior surfaces of the modular fiber optic enclosure.

4. A modular fiber optic enclosure for enclosing optical fiber connections as claimed in claim 2, further comprising a sealing member disposed between the first module and the second module.

5. A modular fiber optic enclosure for enclosing optical fiber connections as claimed in claim 4, further comprising a sealing member disposed between the second module and the cover.

6. A modular fiber optic enclosure for enclosing optical fiber connections as claimed in claim 2, wherein the first module includes a cable clamp.

7. A modular fiber optic enclosure for enclosing optical fiber connections as claimed in claim 2, further comprising a latching mechanism mounted to the cover.

8. A modular fiber optic enclosure for enclosing optical fiber connections as claimed in claim 2, wherein the second module is secured to the first module.

9. A modular fiber optic enclosure for enclosing optical fiber connections as claimed in claim 8, wherein the second module is secured to the first module by a latching mechanism.

10. A modular fiber optic enclosure for enclosing optical fiber connections as claimed in claim 2, wherein the second module is secured to the first module in the second configuration.

11. A modular fiber optic enclosure for enclosing optical fiber connections as claimed in claim 2, wherein the first module includes a plurality of punch-out areas.

12. A modular fiber optic enclosure for enclosing optical fiber connections as claimed in claim 2, wherein the first module includes a splice tray.

13. A modular fiber optic enclosure for enclosing optical fiber connections as claimed in claim 2, wherein the second module includes a plurality of adapters.

* * * * *